United States Patent [19]

Noda

[11] Patent Number: 5,454,029
[45] Date of Patent: Sep. 26, 1995

[54] DIRECTORY ANSWERING MACHINE

[75] Inventor: Mitsuhiko Noda, Kyoto, Japan

[73] Assignee: ROHM Co., Ltd., Kyoto, Japan

[21] Appl. No.: 950,317

[22] Filed: Sep. 24, 1992

[30] Foreign Application Priority Data

Oct. 1, 1991 [JP] Japan ................................. 3-253222

[51] Int. Cl.[6] ................................................. H04M 1/65
[52] U.S. Cl. ........................... 379/88; 379/67; 379/74; 379/76; 379/77; 379/216
[58] Field of Search ............................. 379/67, 88, 89, 379/216, 72, 74, 76, 77

[56] References Cited

U.S. PATENT DOCUMENTS

| | | | |
|---|---|---|---|
| 4,908,849 | 3/1990 | Hashimoto | 379/67 |
| 5,289,523 | 2/1994 | Vasile et al. | 379/309 |

FOREIGN PATENT DOCUMENTS

| | | |
|---|---|---|
| 1117457 | 5/1989 | Japan . |
| 3-55946 | 3/1991 | Japan . |

Primary Examiner—Jeffery A. Hofsass
Assistant Examiner—Fan Tsang
Attorney, Agent, or Firm—Oliff & Berridge

[57] ABSTRACT

A directory answering machine which allows a desired telephone number which is registered in the form of an abbreviated dialing code to be found by an access from an external telephone even when the abbreviated code is forgotten. When a predetermined remote command is received from an external telephone to the answering machine through the telephone line, a control circuit serially reads out the telephone numbers registered in an abbreviated dialing code information memory in the form of abbreviated dialing codes and the subscriber names thereof, converts the read data into speech synthesized by a voice synthesizer, and supplies them to the telephone line through a communication circuit. When a predetermined selection signal is supplied from the external telephone, the subscriber name and the corresponding telephone number which are being output at this point in time are selected. The data are supplied again to the telephone line in a synthesized speech. The resupply may be repeated in response to a repeat signal. In this way, a desired telephone number can be found out from the external telephone.

9 Claims, 5 Drawing Sheets

| CODE | NAME | PHONE NUMBER |
|---|---|---|
| 00 | KAZUO YAMADA | 03-1234-5678 |
| 01 | ICHIRO SATOH | 03-9123-4567 |
| 02 | HANAKO SUZUKI | 01234-45-6789 |
| 03 | KOUJI YAMAMOTO | 0987-65-4321 |
| 04 | KEIKO YOSHIDA | 03-8912-3456 |
| 05 | JIROH ARAI | 0234-56-7891 |
| ⋮ | ⋮ | ⋮ |
| 49 | YOSHIKO SAITOH | 03-4567-8910 |
| 50 | TSUTOMU TANAKA | 03-3456-7890 |

Fig. 2

DIRECTORY ANSWERING MACHINE

BACKGROUND OF THE INVENTION

1. Field of the Invention

The present invention relates to an answering machine and, more particularly, to an answering machine which has a dialing time shortening function.

2. Description of the Related Art

Home telephones have recently been provided with an increasing number of functions. Among others, telephones having an answering function and a dialing time shortening function have become widespread. As is well known, according to the answering function, when there is a telephone call in the absence of the subscriber, it is possible to answer the caller by reproducing the answering message recorded in advance and to record the message from the caller. The dialing time shortening function enables frequently used telephone numbers to be stored in the form of abbreviated dialing codes each of which consists of about two numerals so that the subscriber can make a telephone call by simply designating the abbreviated dialing code.

FIG. 5 shows the main part of a conventional answering machine provided with a dialing time shortening function. This answering machine is provided with a communication circuit 11 which controls the communication with a telephone line 12. A dialing circuit 13 and a voice synthesizer 14 are connected to the communication circuit 11. An abbreviated dialing code memory 15 for storing an abbreviated dialing code in correspondence with a telephone number is connected to the dialing circuit 13. A message memory 16 for storing the answering message and a message from a caller is connected to the voice synthesizer. The dialing circuit 13, the voice synthesizer 14, the abbreviated dialing code memory 15 and the message memory 16 are operated under the control of a control circuit 17.

The operation of the conventional answering machine having the above-described structure will be explained. When there is a phone call to the answering machine in the answering mode, under the control of the control circuit 17, the message memory 16 outputs predetermined answering message data, and the voice synthesizer converts the answering message data into a speech message 18. The speech message 18 is supplied to the telephone line 12 through the communication circuit 11.

A telephone call from this machine is made in the following manner. In dialing the whole telephone number, each digit of the telephone number input by a number key (not shown) is output from the dialing circuit 13 as a DP (dial pulse) signal 19 or a DTMF (dual tone multifrequency) signal 20, and supplied to the telephone line 12 through the communication circuit 11. In contrast, in the case of using an abbreviated dialing code, an abbreviated dialing code data 21 which is input by a code key (not shown) is input to the abbreviated dialing code memory 15 from the control circuit 17, and the dial data 22 which corresponds to the abbreviated dialing code is input to the dialing circuit 13. The dialing circuit 13 supplies the dial data 22 as a DP signal or a DTMF signal to the telephone line 12 through the communication circuit 11.

The telephone numbers which are registered in the form of abbreviated dialing codes are telephone numbers which are comparatively frequently used. However, once they are registered, the owner of the answering machine often forgets these numbers. As a result, when the owner wants to dial one of the registered numbers from another place, it is often the case that the owner remembers not the telephone number but only the abbreviated dialing code thereof. In such a case, the owner needs to consult a memo such as an address book. However, if it is possible to refer to a list on which the registered telephone numbers are entered in correspondence with the abbreviated dialing codes, it is not necessary to carry an address book or the like.

In a conventional answering machine, since the data stored in the abbreviated dialing code memory 15 are only supplied to the dialing circuit 13 in accordance with the command from the control circuit 17 and transmitted from the dialing circuit 13 to the telephone line 12 as a DP signal or a DTMF signal, it is impossible to use these data from an external telephone.

As a countermeasure, Japanese Patent Laid-Open No. Hei 3-55946, for example, discloses telephones which allow the registered dialing information to be referred to from an external telephone through the telephone line. Among these, in a telephone of a first system, the user of an external telephone must actively designate the abbreviated dialing code in order to know the corresponding telephone number. It is therefore impossible to know the desired telephone number when the user also forgets the abbreviated dialing code. In a telephone of a second system, the user of an external telephone must directly designate the name of the subscriber of the desired telephone number in order to know the telephone number. It is therefore necessary to provide a complicated and expensive circuit such as a speech recognizing circuit in the answering machine, so that the answering machine itself becomes inconveniently large and complicated.

SUMMARY OF THE INVENTION

Accordingly, it is an object of the present invention to eliminate the above-described problem in the related art and to provide an answering machine which allows a desired telephone number registered in the form of an abbreviated dialing code to be known by an access from an external telephone even when the abbreviated code is forgotten, without the need for a complicated circuit exclusively for this purpose.

To achieve this aim, the present invention provides an answering machine comprising: a memory means for storing abbreviated dialing code information data including abbreviated dialing codes, the corresponding telephone numbers and the subscriber names thereof; a reading means for serially reading the abbreviated dialing code information data from the memory means in response to a predetermined remote command which is supplied from the telephone line; a voice synthesizer for converting the information data read out by the reading means into a speech; and a voice supply and control means for serially supplying the speech synthesized by the voice synthesizer to the telephone line, and responding to a predetermined selection signal which is supplied through the telephone line so as to resupply, to the telephone line, the speech which was being supplied when the selection signal was received.

The voice supply and control means may not only serially supply the speech synthesized by the voice synthesizer to the telephone line and respond to a predetermined selection signal which is supplied through the telephone line so as to resupply, to the telephone line, the speech which was being supplied when the selection signal was received, but also resupply the resupplied speech whenever a predetermined repeat signal is received.

The voice supply and control means may not only serially supply the speech synthesized by the voice synthesizer to the telephone line and respond to a predetermined selection signal which is supplied through the telephone line so as to resupply, to the telephone line, the speech which was being supplied when the selection signal was received, but also supply the resupplied speech continuously when a predetermined repeat signal is received.

The above and other objects, features and advantages of the present invention will become clear from the following description of the preferred embodiments thereof, taken in conjunction with the accompanying drawing.

BRIEF DESCRIPTION OF THE DRAWINGS

FIG. 2 is an explanatory view of the contents of the abbreviated dialing code information memory in the embodiment shown in FIG. 1;

DESCRIPTION OF THE PREFERRED EMBODIMENTS

The present invention will now be explained in more detail with reference to the following embodiments.

Figure 1:
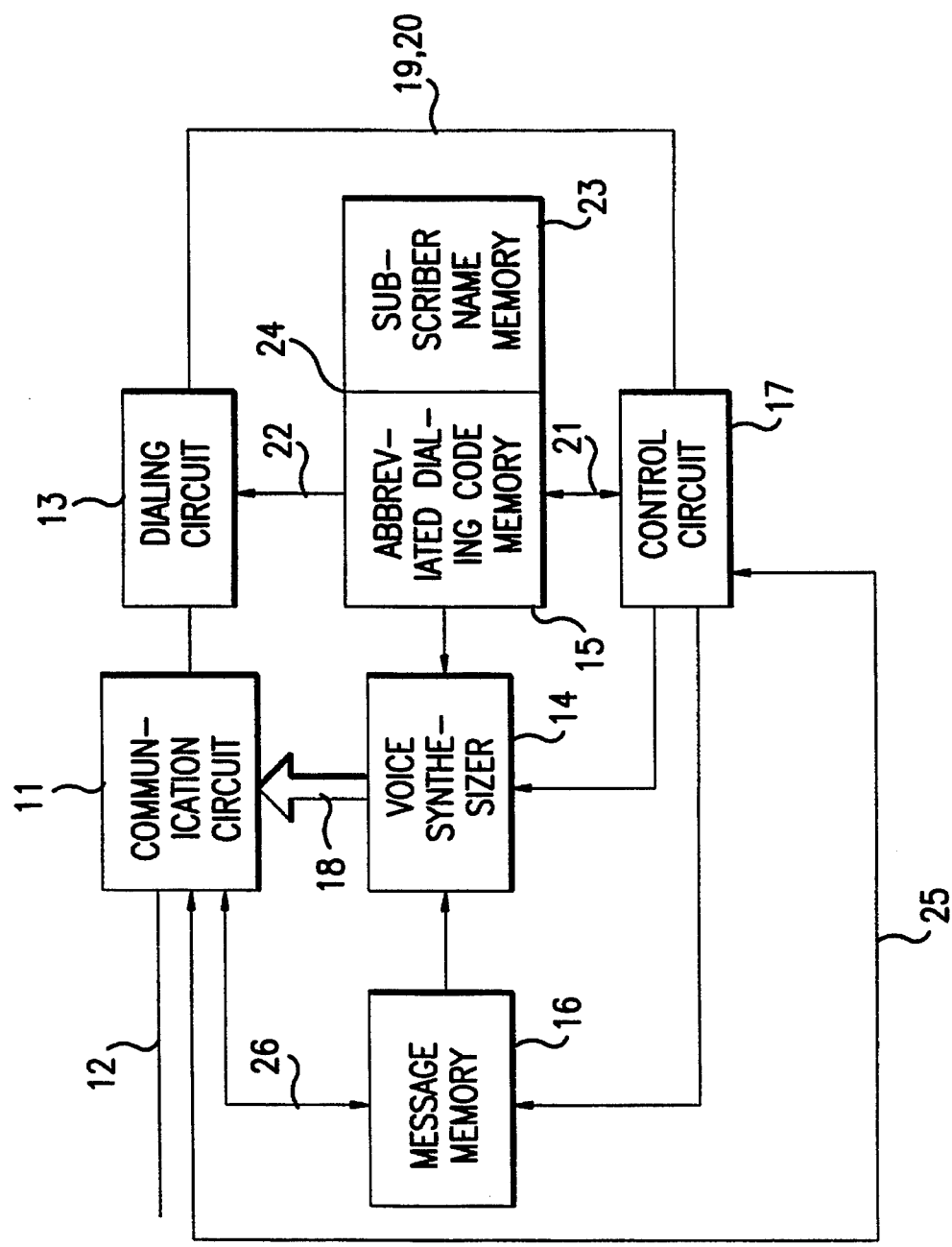
FIG. 1 is a block diagram of the main part of an embodiment of an answering machine according to the present invention.
Figure 5:
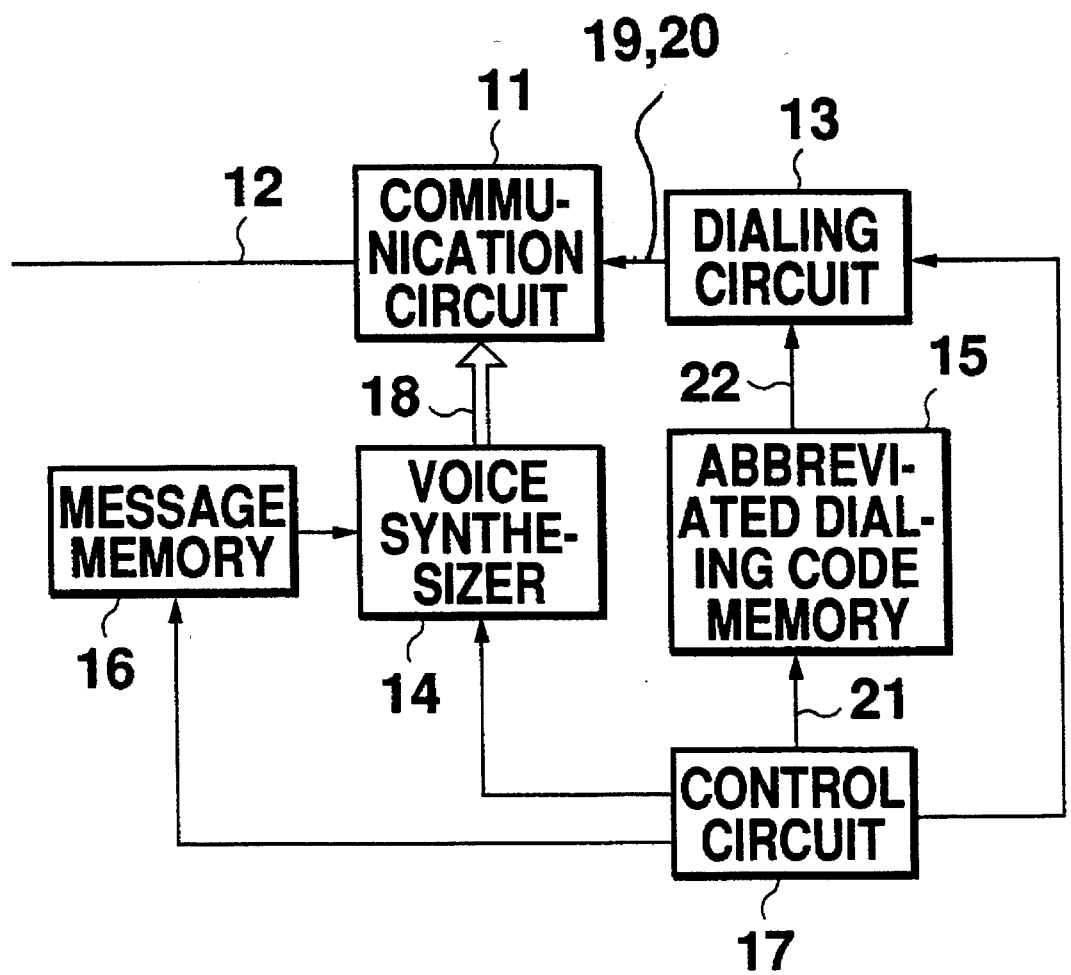
FIG. 5 is a block diagram of the main part of a conventional answering machine.

FIG. 1 shows an embodiment of an answering machine according to the present invention. In FIG. 1, the same numerals are provided for the elements which are the same as those in the related art (FIG. 5), and explanation thereof will be omitted.

The answering machine is provided with the abbreviated dialing code information memory 24 including the abbreviated dialing code memory 15 and a subscriber name memory 23. FIG. 2 equivalently shows the contents of the abbreviated dialing code information memory 24. In the abbreviated dialing code information memory 24, abbreviated dialing codes, subscriber names and telephone numbers are registered in correspondence with each other. In this embodiment, the answering machine can register 51 abbreviated dialing codes from "00" to "50". It is naturally possible to design the dialing code information memory 24 so as to register more than 51 abbreviated dialing codes.

The operation of the answering machine having the above-described structure will now be explained.

Figure 3:
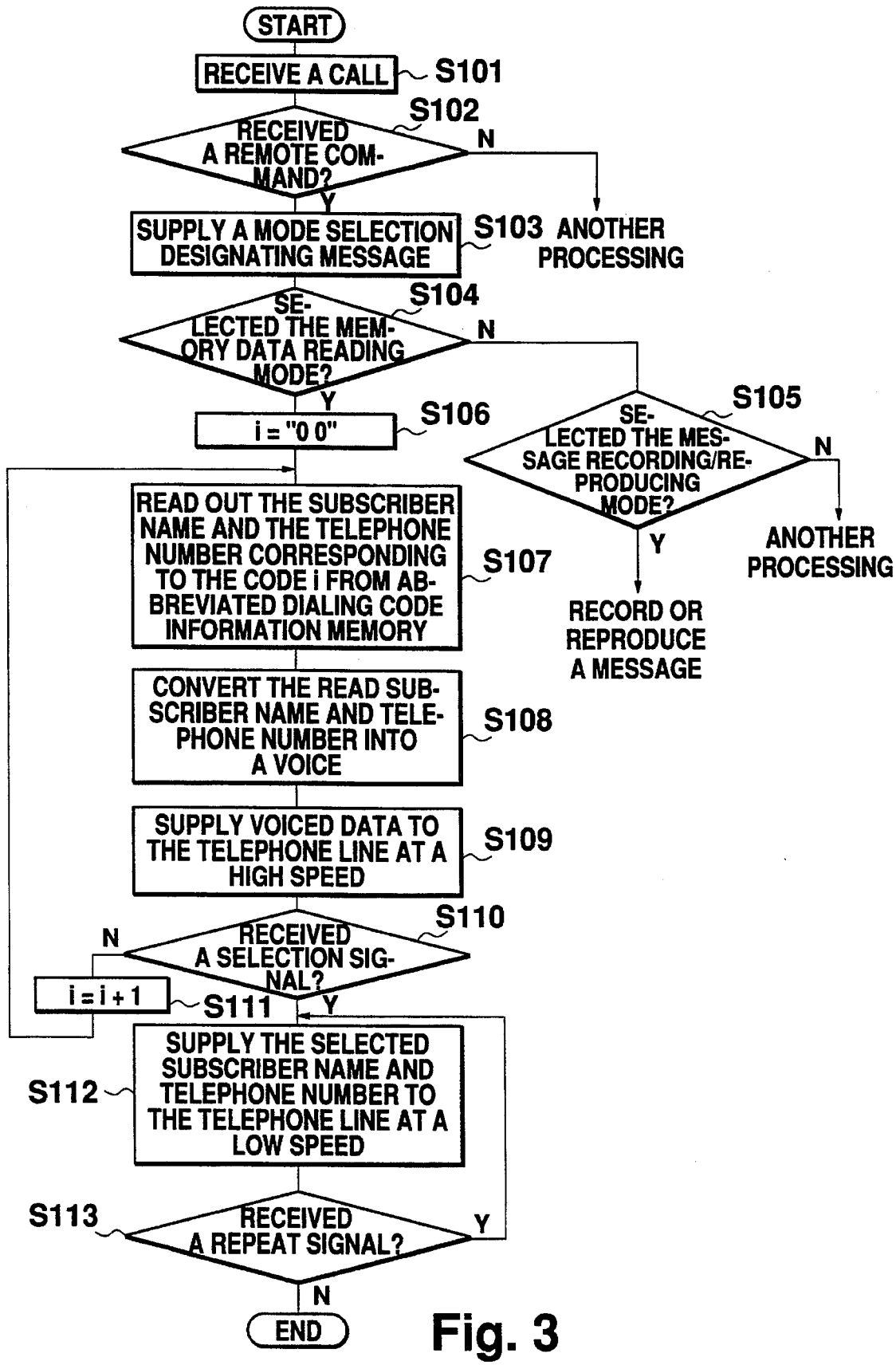
FIG. 3 is a flowchart of the operation of the embodiment shown in FIG. 1.

FIG. 3 is a flowchart of the operation of this embodiment. When there is a telephone call (step S101) and if this is a predetermined remote command (step S102), the control circuit 17 recognizes that the caller from an external telephone is the owner of the answering machine. The control circuit 17 therefore reads data on a mode selection designating message such as "Please select the mode" from a predetermined address of the message memory 16, and supplies the data to the telephone line 12 after converting it into a speech using the voice synthesizer 14 (step S103). As the remote command, a DTMF (dual tone multifrequency) signal is used.

When a predetermined mode selection signal is supplied from the external telephone to the control circuit 17 via circuit path 25 in response to the mode selection designating message, the control circuit 17 processes the signal in accordance therewith. When the message recording/reproducing mode is selected (N at step S104 and Y at step S105), the control circuit 17 newly records an answering message into the message memory via circuit path 26 or reproduces messages recorded by the callers during the absence of the subscriber.

On the other hand, when the memory data reading mode is selected (Y at the step S104,) a series of process steps for outputting the contents of the abbreviated dialing code information memory 24 are executed. The control circuit 17 first selects the abbreviated dialing code "00" (step S 106), and then reads out the subscriber name data and the telephone number data corresponding to the code "00" at a higher speed than the ordinary reading speed (step S107). The reading speed is made higher by, for example, making the reading clock speed higher.

The subscriber name data and the telephone number data read out by the control circuit 17 are converted into a speech by the voice synthesizer 14 (step S108), and the speech is Supplied to the telephone circuit 12 through the communication circuit 11 (step S109). In this way, the subscriber name and the telephone number are output from the receiver of the external telephone. This processing is repeated while incrementing the abbreviated dialing code by one each time (step S111) unless a selection signal from the external telephone is received (N at step S110).

The user of the external telephone listens to the subscriber names and the telephone numbers which are output in a synthesized speech, and when the desired subscriber name is output, the user transmits a selection signal by a predetermined key operation.

When the selection signal is output (Y at the step S110), the control circuit 17 recognizes that the subscriber name and the telephone number which are now being supplied or was supplied immediately before are selected, rereads the selected data and supplies them to the telephone line 12 after converting them into a speech using the voice synthesizer 14 (step S112). At this time, the reading speed is changed to a lower speed so that the user of the external telephone can catch the selected subscriber name and telephone number from a comparatively slowly transmitted speech. The selected data may be reread from the abbreviated dialing code information memory 24. Alternatively, after the data are read out first, they may be stored via circuit path 21 in a register, a buffer memory or the like within the control circuit, and the selected data may be read out therefrom.

When the selected subscriber name and telephone number are output in a synthesized speech, the user of the external telephone line can supply a repeat signal through the telephone line by a predetermined key operation. When the control circuit 17 receives the repeat signal (Y at step S113), the operation at the step S112 is repeated. This operation is repeated whenever the repeat signal is received.

In this way, the owner of the answering machine can find out the desired telephone number by referring to the contents of the abbreviated dialing code information memory 24 which is in the answering machine at the subscriber's residence from an external telephone.

Although only subscriber numbers and telephone numbers are supplied in sets in a first series of speech, the abbreviated dialing code may naturally be added to the data. It is also possible to omit the supply of a repeat signal and to continuously repeat the selected data in a synthesized speech (step S112) when the selection signal is received (Y at the step S110). Alternatively, the selected data in a synthesized speech may be repeated continuously (step S112) when the repeat signal is received (Y at the step S113).

Figure 4:
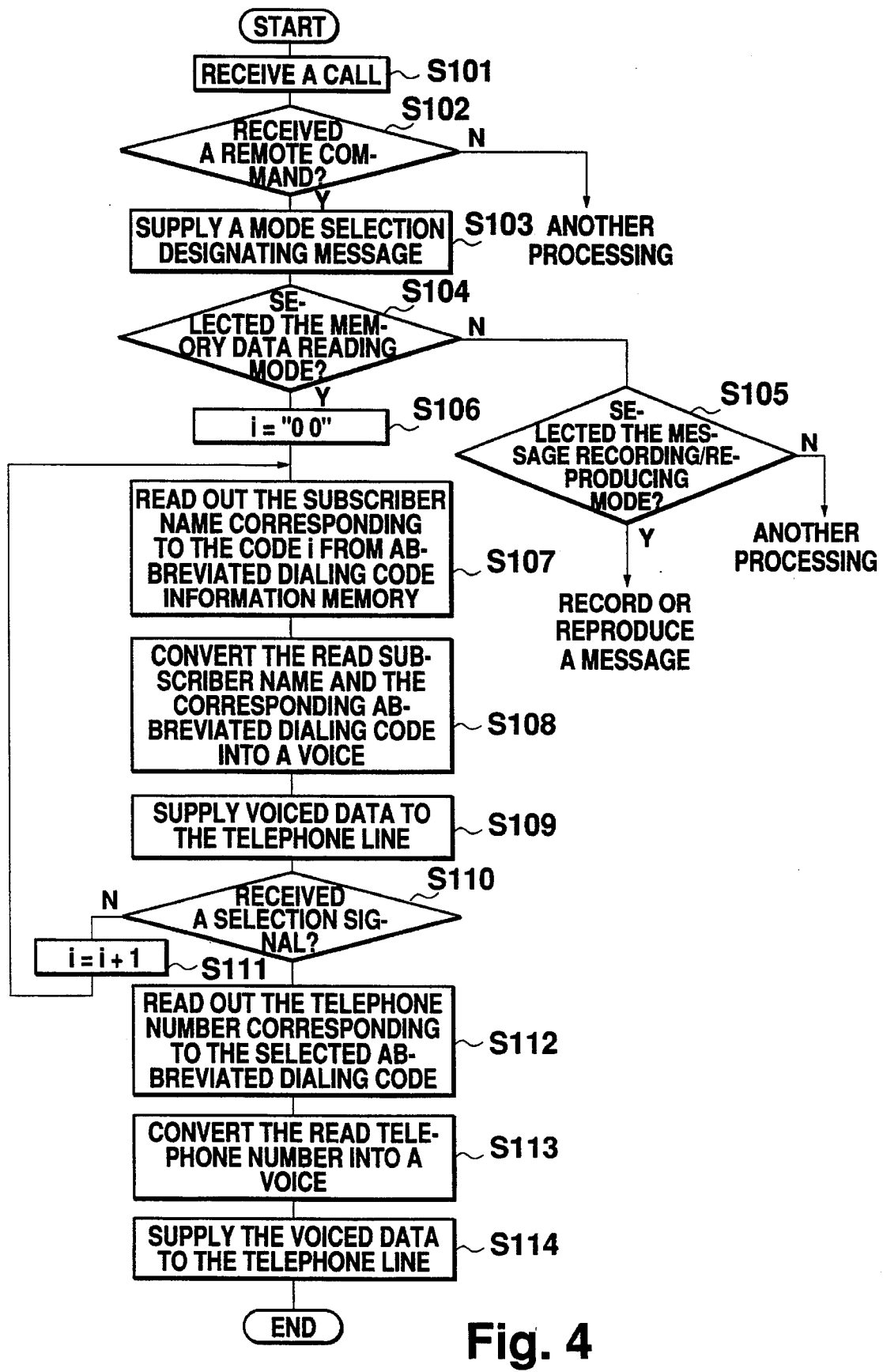
FIG. 4 is a flowchart of the operation of another embodiment of an answering machine according to the present invention.

Another embodiment of an answering machine according to the present invention will now be explained with reference to FIG. 4. In the flowchart shown in FIG. 4, since the operations at steps S101 to S106 are the same as those in the first embodiment shown in FIG. 3, explanation thereof will be omitted.

In this embodiment, the control circuit 17 reads out only the subscriber name data from the abbreviated dialing code information memory 24 (step S107), converts the subscriber name data together with the corresponding abbreviated dialing code using the voice synthesizer 14 (at step S108) and supplies the speech to the telephone line 12 through the communication circuit 11 (step S109). This processing is repeated while incrementing the abbreviated dialing code by one each time (step S111) unless a selection signal from the external telephone is received (N at step S110).

The user of the external telephone listens to the abbreviated dialing codes and the subscriber names which are output in a synthesized speech, and when the desired subscriber name is output, the user transmits a selection signal by a predetermined key operation.

When the selection signal is output (Y at the step S110), the control circuit 17 recognizes that the abbreviated dialing code and the subscriber name which are now being supplied or was supplied immediately before are selected, and rereads the corresponding telephone number data from the abbreviated dialing code information memory 24 (step S112). The read telephone number data is converted into a speech by the voice synthesizer 14 (step S113) and is supplied to the telephone line 12 (step S114). As a result, the selected telephone number is output from the receiver of the external telephone.

In this way, the owner of the answering machine can find out the desired telephone number by referring to the contents of the abbreviated dialing code information memory 24 of the answering machine at his own residence from an external telephone. Although abbreviated dialing codes and telephone numbers are supplied in sets in a first series of speech, only the subscriber names may be serially supplied.

A method of selecting desired information from the data which are unilaterally supplied from the answering machine to an external telephone, in other words a passive method, is adopted in these embodiments. Alternatively, a method of actively designating a desired telephone number by inputting the corresponding abbreviated dialing code from an external telephone may be adopted. In this case, the control circuit 17 reads out the corresponding subscriber name and telephone number from the abbreviated dialing code information memory 24 while using the designated abbreviated dialing code as a retrieval key, and supplies them after converting them into a speech.

As described above, according to the present invention, since the contents of the memory of the answering machine at the subscriber's residence are read out in accordance with a predetermined command supplied from an external telephone, and the read data are supplied to the telephone line in a synthesized speech, it is possible to refer to the abbreviated dialing code information stored in the answering machine at the residence from an external telephone. Consequently, even when the owner of the answering machine neither remembers the telephone number of a person whom he wants to call nor has an address book or the like, the owner can call the desired telephone number from an external telephone. In addition, the answering machine of the present invention obviates a complicated means such as a voice recognizing circuit which is required in a conventional apparatus, and so a compact answering machine is provided at a low cost.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A directory answering machine, comprising:

answering means for answering an incoming telephone call from a telephone line;

memory means for storing a plurality of directory data units, each directory data unit including an abbreviated dialing code, a corresponding telephone number and a corresponding subscriber name;

reading means for reading at least one of said plurality of directory data units from said memory means in response to a predetermined remote caller command received from the telephone line of the incoming telephone call;

a voice synthesizer coupled to said reading means, said voice synthesizer converting a portion of each directory data unit read out by said reading means into a speech unit, the portion comprising at least one of the abbreviated dialing code, the subscriber name and the telephone number, said voice synthesizer outputting at least one first speech message comprising a corresponding speech unit; and speech supply and control means for supplying the at least one first speech message output by said voice synthesizer to the telephone line, for responding to a predetermined selection signal received from the telephone line, for selecting a current first speech message and for supplying a second speech unit to the telephone line, the current first speech message being the first speech message currently supplied by the speech supply and control means to the telephone line, the second speech unit corresponding to the selected current first speech message.

2. A directory answering machine according to claim 1, wherein said speech supply and control means continuously repeats the resupply of the second speech unit in response to a predetermined selected signal.

3. A directory answering machine according to claim 1, wherein the current first speech message is the second speech unit.

4. A directory answering machine according to claim 1, wherein the voice synthesizer converts a second portion of each directory data unit read out by said reading means into the second speech unit, the second portion comprising one of the subscriber name and a name-number, the name-number comprising the subscriber name and the corresponding telephone number.

5. A directory answering machine according to claim 1, wherein said speech supply and control means supplies said at least one first speech message to the telephone line at a first speed and resupplies said second speech unit in response to said predetermined selection signal at a second speed.

6. A directory answering machine, comprising:

answering means for answering an incoming telephone call from a telephone line;

memory means for storing a plurality of directory data units, each directory data unit including an abbreviated dialing code, a corresponding telephone number and a corresponding subscriber name;

reading means for reading at least one of said plurality of directory data units from said memory means in response to a predetermined remote caller command received from the telephone line of the incoming telephone call;

a voice synthesizer coupled to said reading means, said voice synthesizer converting a portion of each directory data unit read out by said reading means into a speech unit, the portion comprising at least one of the abbreviated dialing code, the subscriber name and the telephone number, said voice synthesizer outputting at least one first speech message comprising a corresponding speech unit; and speech supply and control means for supplying the at least one first speech message output by said voice synthesizer to the telephone line, for responding to a predetermined selection signal received from the telephone line, for selecting a current first speech message and for supplying a second speech unit to the telephone line whenever a predetermined repeat signal is received, the second speech unit corresponding to the selected current first speech message, the current first speech message being currently supplied by the speech supply and control means to the telephone line.

7. A directory answering machine, comprising:

answering means for answering an incoming telephone call from a telephone line;

memory means for storing a plurality of directory data units, each directory data unit including an abbreviated dialing code, a corresponding telephone number and a corresponding subscriber name;

reading means for reading at least one of said plurality of directory data units from said memory means in response to a predetermined remote caller command received from the telephone line of the incoming telephone call;

a voice synthesizer coupled to said reading means, said voice synthesizer converting a portion of each directory data unit read out by said reading means into a speech unit, the portion comprising at least one of the abbreviated dialing code, the subscriber name and the telephone number, said voice synthesizer outputting at least one first speech message comprising a corresponding speech unit; and speech supply and control means for supplying the at least one first speech message output by said voice synthesizer to the telephone line, for responding to a predetermined selection signal received from the telephone line, for selecting a current first speech message and for supplying continuously and repeatedly a second speech unit to the telephone line when a predetermined repeat signal is received, the second speech unit corresponding to the selected current first speech message, the current first speech message being currently supplied by the speech supply and control means to the telephone line.

8. A directory answering machine, comprising:

an answering device for answering an incoming telephone call from a telephone line;

a memory for storing a plurality of directory data units, each of said directory data units including at least a telephone number and a corresponding subscriber name, at least a portion of one of the plurality of directory data units being read out in response to an abbreviated dialing code receiver from the telephone line;

a reader for continuously reading a first portion of each of a series of said plurality of directory data units from said memory in response to a predetermined remote command received from the telephone line;

a voice synthesizer coupled to said reader, said voice synthesizer converting said first portions of said series output by said reader into corresponding series of first speech units, said voice synthesizer supplying said series of first speech units to the telephone line; and a controller for selecting a current directory data unit corresponding to a current one of said series of first speech units in response to a predetermined selection signal received from the telephone line and outputting a second portion of the selected directory data unit comprising at least one of the telephone number and the corresponding subscriber name to said synthesizer, said synthesizer converting the second portion into a second speech unit and supplying the second speech unit to the telephone line.

9. The directory answering machine of claim 8, wherein the current one of the series of speech units is the first speech unit of said series of first speech units currently being supplied to the telephone line.

* * * * *